Patented Nov. 8, 1949

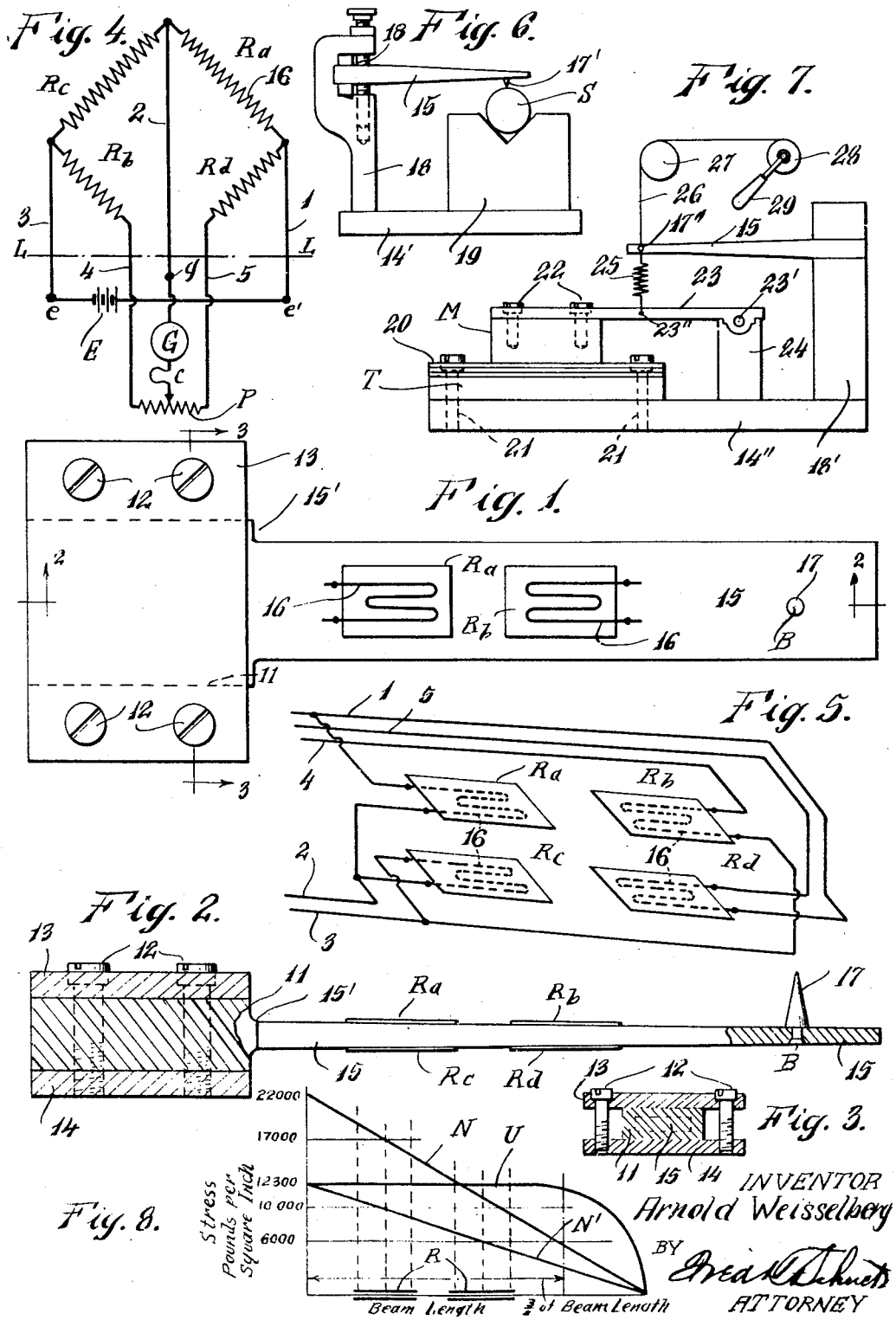

2,487,681

UNITED STATES PATENT OFFICE 2,487,681

ELECTRICAL GAUGING DEVICE

Arnold Weisselberg, Leonia, N. J.

Application October 18, 1945, Serial No. 623,118

3 Claims. (Cl. 201—63)

This invention relates to apparatus employing a flexible elastic member which in the operation of such apparatus is subject to deflection, which deflection is translated into electrically measureable quantities by means of strain gauges.

The object of the present invention is to provide a device of this class which will be extremely sensitive and accurate, and which will respond uniformly, within a wide range, to variations in the occurring deflection. Other advantages of the invention will be pointed out hereinafter. The invention is susceptible of many different uses. In some cases, the purpose is to measure the deflection of the flexible member caused by gauging a dimension; in other cases, the apparatus may be employed to determine the magnitude of certain forces; and numerous further applications are possible. Two examples of the ways in which this invention may be utilized are indicated in the description following hereinafter.

Without desiring to restrict myself to the particular construction here disclosed, I will now describe a typical example of my improved device and two examples of its applications, as illustrated by the accompanying drawings, in which Fig. 1 is a plan view of the device;

Fig. 2 is a longitudinal section on line 2—2 of Fig. 1;

Fig. 3 is a cross section, on a reduced scale, taken on line 3—3 of Fig. 1;

Fig. 4 is a diagram showing a preferred way of connecting the device of Figs. 1 to 3 in a Wheatstone bridge arrangement with electrical indicating means;

Fig. 5 is a diagrammatic perspective view illustrating the electrical connections of the strain gauges;

Fig. 6 illustrates the application of my invention to determine whether a cylindrical object, for instance a shaft, has a truly circular cross section;

Fig. 7 illustrates the application of my invention to the measurement of the force required to pull a magnet away from a body of iron or other magnetic material; and Fig. 8 is a diagram illustrating certain advantages obtained by giving the flexible member a special form devised by me.

In the device of Figs. 1, 2, and 3, the bar-like body or shank 11, of rectangular form, is held or clamped firmly with the aid of screws 12, between two members, 13, 14. Integral with this shank, or at least firmly supported thereby, is one end of the flexible cantilever beam 15 which constitutes the deflection member of the device. This beam is shown of uniform width (Fig. 1) and rectangular cross section (Fig. 3), and decreasing in thickness gradually from its supported end or "root" 15' to its free end or tip. Theoretical considerations indicate that this thickness should vary according to a cubical parabola. However, for easier manufacture, I use the approximation shown, which yields quite satisfactory results, as will be explained hereinafter. In this approximation, the beam is given a wedge-shaped (Fig. 2), with both surfaces of the wedge made plane, and I have found that the best results are obtained, with this form of beam, when the thickness near the tip, at the point B (Figs. 1 and 2) from which the deflection of the beam is measured, is about .4 (two fifths) of the thickness at the root or supported end 15'. With this form of beam, I obtain the important advantage that upon deflection the beam will be stressed uniformly, as more fully explained hereinafter, for nearly three-fourths of its length, measured from the root 15'. For best results, the material of which the beam is made should have the lowest possible hysteresis combined with the highest possible ratio of elastic limit to Young's modulus of elasticity. Some of the magnesium alloys also known as Dow metal meet this condition.

On the two converging surfaces of the beam 15 I attach strain gauges of the type employing electrical resistances, for instance thin wires 16 extending mainly lengthwise of the beam 15 and insulated therefrom but firmly secured thereto, as by using a suitable cement, for instance Bakelite cement. The resistance wires 16, as well as the cement in which they are embedded, should be of low-hysteresis material. The strain gauges are provided in pairs, the gauges of the same pair being located in registry with each other on opposite surfaces of the beam. In the example illustrated, I have shown two pairs of such strain gauges (Figs. 2 and 5). Each pair has one of its gauges, as $R_a$ and $R_b$, mounted on one of the beam surfaces (the one on the tension side), while the companion gauges $R_c$ and $R_d$ respectively, are mounted on the opposite (compression) side of the beam. All these gauges should be placed on that portion of the beam which is stressed uniformly under deflection, that is to say, no farther than about three-fourths of the beam length from the root 15', measuring such beam length from 15' to B. The individual strain gauges should be nearly or practically equal as to their electrical resistance.

In the circuit arrangement shown diagrammatically in Fig. 4 and partly indicated in Fig.

5, five leads are employed to connect the ends of the strain gauge wires 16 with the other parts of the electrical equipment. Lead 1 connects one wire end of each of the strain gauges $R_a$ and $R_d$ with one terminal, $e'$, of a battery E or its equivalent; lead 2 connects the other wire end of gauge $R_a$ and one wire end of gauge $R_c$ with one terminal $g$ of an electrical indicating instrument, for instance a galvanometer G; lead 3 connects the other wire end of gauge $R_c$ and one wire end of gauge $R_b$ with the other terminal, $e$, of battery E or other source of electric current; leads 4 and 5 connect the other wire ends of gauges $R_b$ and $R_d$ individually with opposite terminals of a potentiometer P. The five leads may conveniently be carried along the beam 15 toward the shank 11 and then along said shank in the spaces between it and the screws 12, see Fig. 3. The other terminal of the galvanometer G is connected with a contact C adjustable lengthwise of the potentiometer. The parts shown in Fig. 4 below the line L—L are generally separated from the elements shown above that line and may be located at any suitable distance therefrom. The said elements constitute a unitary structure or gauging head with the other parts illustrated in Figs. 1, 2, and 3. The strain gauges $R_c$ and $R_d$ are practically opposite their companions $R_a$ and $R_b$ respectively, that is to say, in substantial transverse registry therewith, see Figs. 2 and 5. The electrical circuit in Fig. 4 is a Wheatstone bridge arrangement which I have found to be extremely efficient and sensitive in connection with my improved apparatus, the galvanometer needle showing much greater deflections, under similar conditions of the strain gauges, than with other Wheatstone bridge arrangements. While some other arrangements will yield fairly good results, I prefer the circuit arrangement shown as greatly superior.

I have not shown scales in connection with the galvanometer G and the potentiometer P, but it will be understood that such scales are generally provided for these instruments.

As hereinbefore mentioned, deflection of the beam will stress it uniformly upon the greater portion of its length. The advantage of this feature, due to the tapering form of the beam, is brought out graphically in Fig. 8. For what may be called a "straight" beam, that is to say, one of uniform cross sectional area, and particularly of uniform thickness, the stress at different points of its length will vary in direct ratio to the distance between the point of support and the point at which the deflection is produced; the straight inclined lines illustrate this condition. On the other hand, with my tapering beam, the stress will be as represented by the line U, which is horizontal for nearly three-fourths of the beam length and only then drops in a sharp curve. For instance, assuming the position of the two pairs of strain gauges as indicated at R, the stress for the "straight" beam N (at the midpoint of the upper pair) will be about 17,000 pounds per square inch, which high stress with the particular material of which the beam is made, will go beyond the permissible limit the exceeding of which would result in permanent deformation of the beam. On the other hand, with my improved beam, the stress with the strain gauges in the same position relatively to the beam length, is only 12,300 pounds per square inch, well below the permissible limit, assuming the two beams to be made of the same material. Furthermore, if we assume a "straight" beam such as indicated by the line N', with a maximum stress of 12,300 pounds per square inch (that is, below the permissible limit) then, with the strain gauges in the same position relatively to the beam length as above, the stress will be 10,000 pounds per square inch for one pair and 6,000 pounds per square inch for the other, that is to say, a strain will result corresponding to 16,000 pounds per square inch for the two pairs. With the improved beam, however, the stress will be the same for each pair of strain gauges, and therefore a strain corresponding to twice 12,300 or 24,600 for the two pairs will result. Accordingly, the reading on the instrument in the Wheatstone bridge (which reading is proportional to the aggregate strain on the two pairs) will be higher in the case of the taper beam than with the "straight" one within a like permissible stress limit, in the ratio of 24,600 to 16,000, or better than 1.5. This is another important advantage of my improved beam.

Not only is the stress uniform as just explained, but since the changes in resistance corresponding to changes of strain in the strain gauges, and the accompanying changes in the current passing through the strain gauges are proportional to these changes in strain, the current passing through the electrical indicating instruments (G and P) will be proportional to the deflection of the beam 15 at the point B. I may therefore employ indicating instruments having the customary uniform graduation scale and avoid the necessity for uneven graduations of specially calibrated scales.

With a construction and arrangement having the characteristics described, millivolt readings directly proportional to the strain under test may be obtained on the galvanometer G, the potentiometer P, or other suitable instrument, over the entire range for which the apparatus has been designed, for instance a deflection of .025" and over, while still measuring with a degree of accuracy as high as ±.0002" and better.

In using the apparatus, I may set the potentiometer P at zero and observe the reading on the galvanometer directly as a measure of the beam deflection. However, instead of this, I prefer to proceed as follows: The galvanometer needle having been deflected as before, I move the sliding potentiometer contact C from its zero or initial position until the galvanometer needle is set back to zero. This method yields better results because the potentiometer readings are finer than those of the galvanometer, the movement of the contact C, for the same results, being greater than that of the galvanometer needle.

At the point B where the deflection of the beam is to be measured, I provide suitable means for insuring that the deflection will be initiated at that point. For this purpose, the point B might be suitably marked on the beam, for instance by a depression in its surface; or a projection, such as 17 (Fig. 2) might be provided at said point, to serve as a feeler to engage an article or surface being tested. This projection might extend from one side of the beam or the other. In Fig. 2, the feeler 17 projects upwardly.

Fig. 6 shows diagrammatically the application of my invention to testing a shaft, rod, or other round article for any departure from its true circular cross section. On a suitable base 14' is mounted a standard 18 supporting one end of the cantilever beam 15, preferably in such a way as to permit up and down adjustment of the beam, as by means of a non-rising spindle 18' threaded through the beam. At the deflection point corresponding to B, the beam has a downwardly extending feeler 17' adapted for contact with the periphery of the shaft S or other article to be tested, said article being lodged, with freedom of rotation about its axis, in a suitable recess or seat, preferably of V-shape, in the upper surface of a support 19 likewise mounted on the base 14'. It will be understood that the beam carries strain gauges of the character described in connection with Figs. 1 and 2 and that said gauges are connected in a suitable Wheatstone bridge circuit, for instance the one shown in Fig. 4. The apparatus is operated by turning the article S about its axis to different positions and noting the reading of the electrical indicating instruments in each of these positions. Any change in such reading will, of course, mean that the article is not truly circular at the particular cross section investigated, and will also give a measure of such discrepancy.

In Fig. 7 the base 14" carries a standard 18' for supporting the cantilever beam 15. To this base is also secured, as by means of screws 21, the article T to be tested, such article being made of iron or other magnetic material. On top of the test article T, there is a layer 20 of brass or other non-magnetic material. On the upper surface of the layer 20 rests a magnet M, secured by screws 22 to an arm or bar 23, pivoted at 23' to a standard 24 mounted on the base 14". Mutual attraction between the test article T and the magnet M holds the latter in contact with the layer 20, with a force depending on the thickness of the non-magnetic layer. The cantilever beam 15 is provided, at a point corresponding to B, with a pin 17" or other suitable means for attaching one end of a spring 25, the other end of which is attached to the arm 23, as indicated at 23". A wire or other flexible connection 26 extends from the beam 15, preferably at 17", and leads to suitable means for exerting a pull on the beam 15, and through the spring 25 on the arm 23 and magnet M, in a direction tending to separate the magnet from its resting place on the layer 20. For instance, the flexible connection 26 might be led in contact with a pulley 27 and then wind on a drum 28 to which the end of said connection is fastened, a crank or handle 29 serving to turn the drum and thus pull the beam 15 upward by means of the flexible connection 26. In making the test, the pull on this connection would be increased gradually, to deflect the beam 15 upward, producing a corresponding indication by the electrical means in circuit with the strain gauges of the beam. At the same time, the spring 25 would be put under tension, or its tension would be increased, without however at once lifting the magnet M. Only when the pull on the flexible connection reaches a certain magnitude will the magnet M lift off the top surface of 20 with a sudden snap. The corresponding deflection of the beam at this moment, as indicated by the electrical means in the Wheatstone bridge circuit, is an index of the force required to overcome the magnetic pull. The apparatus will in this case measure the magnitude of the force required to pull the magnet M away from its original position, that is to say, a force just sufficient to overbalance the mutual attraction between the magnet M and the test article T when at their original distance from each other. I might employ an arrangement in which the spring 25 and the arm 23 are omitted, and the magnet mounted directly on the beam.

In these particular cases, as in any others in which the maximum or other special deflection to be determined occurs only for an instant, it is desirable to substitute for the galvanometer G, an electrical instrument, for instance an oscillograph, which will preserve an indication or a record of such maximum or other special deflection.

While I have shown the beam 15 in a horizontal position, so that the strain gauges are on the upper and the lower sides of the beam, it is to be understood that the device will be operative in other positions as well, and where I have used the terms "upper" and "lower" with respect to the gauge-carrying surfaces, this has been done simply for greater ease in description.

I claim as my invention:

1. A gauging element comprising a cantilever beam the thickness of which decreases lengthwise of the beam from one of its ends to the point at which deflection is produced, said decrease being in about the relation of 1 to .4 from said end to said point, and electrical resistance strain gauge means mounted on said beam.

2. A gauging element comprising a cantilever beam the thickness of which decreases lengthwise of the beam from one of its ends to the point at which deflection is produced, said decrease being in about the relation of 1 to .4 from said end to said point, and electric resistance strain gauge means mounted on that portion of the beam which constitutes about three-fourths of its length from said end to said point.

3. A gauging element comprising a cantilever beam the thickness of which decreases lengthwise of the beam, according to a cubical parabola, from one of the beam ends to the point at which the deflection is produced, and electric resistance strain gauge means mounted on said beam.

ARNOLD WEISSELBERG.

REFERENCES CITED

The following references are of record in the file of this patent:

UNITED STATES PATENTS

| Number | Name | Date |
|---|---|---|
| 1,641,296 | Scott | Sept. 6, 1927 |
| 1,928,457 | Mershon et al. | Sept. 26, 1933 |
| 2,316,203 | Simmons | Apr. 13, 1943 |
| 2,316,975 | Ruge | Apr. 20, 1943 |
| 2,321,322 | Ruge | June 8, 1943 |
| 2,322,319 | Ruge | June 22, 1943 |
| 2,336,500 | Osterberg | Dec. 14, 1943 |
| 2,344,642 | Ruge | Mar. 21, 1944 |
| 2,377,869 | Elliott | June 12, 1945 |

OTHER REFERENCES

Martin, A Simple Moment or Force Measuring Instrument, Report #1526, December 17, 1941, The Glenn L. Martin Company.

"Strength of Materials," by James E. Boyd; pages 197-198.